United States Patent [19]
Liao et al.

[11] Patent Number: 5,883,379
[45] Date of Patent: Mar. 16, 1999

[54] DEVICE AND METHOD CAPABLE OF CONVERTING A POSITION SIGNAL INTO A FREQUENCY SIGNAL USING A PHOTOELECTRIC POSITION SENSITIVE DETECTOR

[75] Inventors: Tai-Shan Liao, Taichung; Chun-Ming Chang, Taipei, both of Taiwan

[73] Assignee: National Science Council, Taiwan

[21] Appl. No.: 872,419

[22] Filed: Jun. 10, 1997

[51] Int. Cl.[6] ........................................... G01J 1/20
[52] U.S. Cl. .................. 250/214 R; 250/201.6; 356/3.04; 396/106; 327/514
[58] Field of Search ............................ 250/201.6, 214 R, 250/214.1, 214 A; 356/3.04; 396/104, 106, 120; 327/514

[56] References Cited

U.S. PATENT DOCUMENTS 5,005,970   4/1991   Kunishige .............................. 356/3.04
5,200,602   4/1993   Ikebe et al. ........................... 250/201.6

Primary Examiner—Stephone Allen
Attorney, Agent, or Firm—Randall J. Knuth

[57] ABSTRACT

A device and method capable of converting a position signal into a frequency signal using a photoelectric position sensitive detector is provided. The device capable of converting a position signal into a frequency signal comprises: a PSD, two current mirrors, a variable optimum constant current source, and a converter. The method capable of converting a position signal into a frequency signal comprises: providing a PSD, providing two current mirrors, providing a variable optimum constant current source, and providing a converter to convert a position signal into a frequency via a relationship.

7 Claims, 4 Drawing Sheets

$I1 < I2$
$Ic = Ib + I2 - I1_m > Ib$ $I1_m = I2$
$Ic = Ib$
$X = |X2 - X1|/2$ $I1 > I2$
$Ic = Ib + I2 - I1_m < Ib$

DEVICE AND METHOD CAPABLE OF CONVERTING A POSITION SIGNAL INTO A FREQUENCY SIGNAL USING A PHOTOELECTRIC POSITION SENSITIVE DETECTOR

BACKGROUND OF THE INVENTION

1. Field of the Invention

The present invention relates to a device and method capable of converting a position signal into a frequency signal, and more particularly relates to a device and method capable of converting a position signal into a frequency signal using a photoelectric position sensitive detector (PSD).

2. Description of the Related Art

In the prior art of a photoelectric system capable of displaying a position signal, two terminals of a PSD output two photocurrents when a light spot is detected by the PSD. FIG. 1 shows a device and method of calculating a light spot position according to the prior art. As shown in FIG. 1, two photocurrents (I1, I2) are respectively converted into two voltage signals (Vx1, Vx2) by two operational amplifiers (OP AMP) A1 and A2. An adder outputs a (Vx1+Vx2) voltage signal; a subtracter outputs a (Vx2−Vx1) voltage signal; and a divider outputs a (Vx2−Vx1)/(Vx1+Vx2) i.e. [(I2−I1)R1/(I1+I2)R1] voltage signal. The (Vx2−Vx1)/(Vx1+Vx2) voltage signal will be converted into a signal via an analog-to-digital (A/D) converter and a single chip microprocessor. Then a signal corresponding to the light spot falling on PSD will be shown on an LCD panel.

However, this kind of prior art has the following disadvantages. First, it is too complicated due to usage of a lot of circuits, for example, a divider, or an A/D converter . . . etc. Second, a DC drift signal due to DC amplifier circuit will influence the displaying result.

SUMMARY OF THE INVENTION

Accordingly, there is a need to improve the prior art.

The main object of the present invention is to provide a device and method capable of converting a position signal into a frequency signal using a photoelectric position sensitive detector.

One object of the present invention is to simplify the prior art circuit.

Another object of the present invention is to provide a device and method unaffected by a DC drift signal resulting from DC amplifier circuit.

A novel device and method capable of converting a position signal into a frequency signal using a photoelectric position sensitive detector is provided according to the present invention. FIG. 2 is a simple diagram presenting the present invention. Now referring to FIG. 2, a device capable of converting a position signal into a frequency signal, comprising: a PSD 102, having a first output terminal X1, a second output terminal X2, and a voltage terminal Vt wherein said first output terminal X1 of said PSD 102 outputs a first value I1 of a first photocurrent and said second output terminal X2 of said PSD 102 outputs a second value I2 of a second photocurrent when a light spot is detected by said PSD 102; a first current mirror 125, coupled with said first output terminal X1 of said PSD 102, mirroring said first photocurrent to generate a first mirror current I1m having a current value substantially equal to said first value I1; a second current mirror 124, coupled with said voltage terminal Vt of said PSD 102, providing a working current I0 equal to a sum of said first photocurrent and said second photocurrent to said PSD 102 and generating a second mirror current I0m having a value substantially equal to said I0; a variable optimum constant-current source 110, coupled to said second output terminal X2 of said PSD 102, generating a constant current having a third value Ib, wherein Ib is larger than both the maximum values of said I1 and said I2; and a converter 127, coupled to said second output terminal X2 of said PSD 102, converting said first mirror current, said second photocurrent, and said constant current into a frequency signal.

FIG. 2 also shows a method of the present invention. A method capable of converting a position signal into a frequency signal comprises: providing a PSD having a first output terminal, a second output terminal, and a voltage terminal wherein said first output terminal of said PSD outputs a first value I1 of a first photocurrent and said second output terminal of said PSD outputs a second value I2 of a second photocurrent when a light spot is detected by said PSD; providing a first current mirror coupled to said first output terminal of said PSD, mirroring said first photocurrent to generate a first mirror current I1m having a value substantially equal to said I1; providing a second current coupled to said voltage terminal of said PSD and a power supply, providing a working current I0 equal to a sum of said first photocurrent and said second photocurrent to said PSD and generating a second mirror current I0m having a value substantially equal to said I0; providing a variable optimum constant-current source coupled to said second output terminal of said PSD, generating a constant current having a third value Ib, wherein Ib is larger than both the maximum values of said I1 and said I2; and providing a converter coupled to said second output terminal of said PSD, having a resistance value and a capacitance value, converting a synthesis current Ic=Ib+I2−I1m into a frequency signal via a relationship X=f=kIc/VC, wherein X is the position signal of said light spot; f is the frequency signal of said light spot; k is a constant depending on aspect of the voltage divider in the resistors across both a negative input terminal of an operational amplifier and a positive input terminal of another operational amplifier of said converter; C is said capacitance value of said converter; and V is the voltage level of said power supply.

The device of present invention is simpler than that of prior art because the position calculation method is changed from a voltage signal (Vx2−Vx1)/(Vx1+Vx2) to a current signal Ic=Ib+I2−I1m. The relationship between a synthesis current and a frequency of a frequency signal (or a position) is X(position)=f=kIc/VC. In other words, a different position signal corresponds to a different frequency signal, as shown in FIG. 3. If a light spot is located on the middle point of PSD, a frequency corresponding to a condition I1=I2 is referred as a middle frequency. If a light spot is located near X2 terminal, a frequency corresponding to a condition I1<I2 is higher than the middle frequency. If a light spot is located near X1 terminal, a frequency corresponding to a condition I1>I2 is lower than the middle frequency.

Now referring to FIG. 2, the variable optimum constant-current source can be used to compensate for a dark current difference between the first terminal X1 and the second terminal X2 of the PSD. The negative current mirror coupled with the PSD provides a working current I0 and a second mirror current I0m. The second mirror current I0m can be used to identify whether the light spot is located on the PSD.

Compared with the prior art, the present invention does not require a divider and an A/D converter, so the circuit of the present invention is simpler than that of the prior art.

DESCRIPTION OF THE DRAWINGS

Other objects, features, and advantages of the present invention will become apparent from the following detailed description made with reference but non-limiting embodiment. The description is made with reference to the accompanying drawings, in which.

DESCRIPTION OF THE PREFERRED EMBODIMENT

Figure 4:
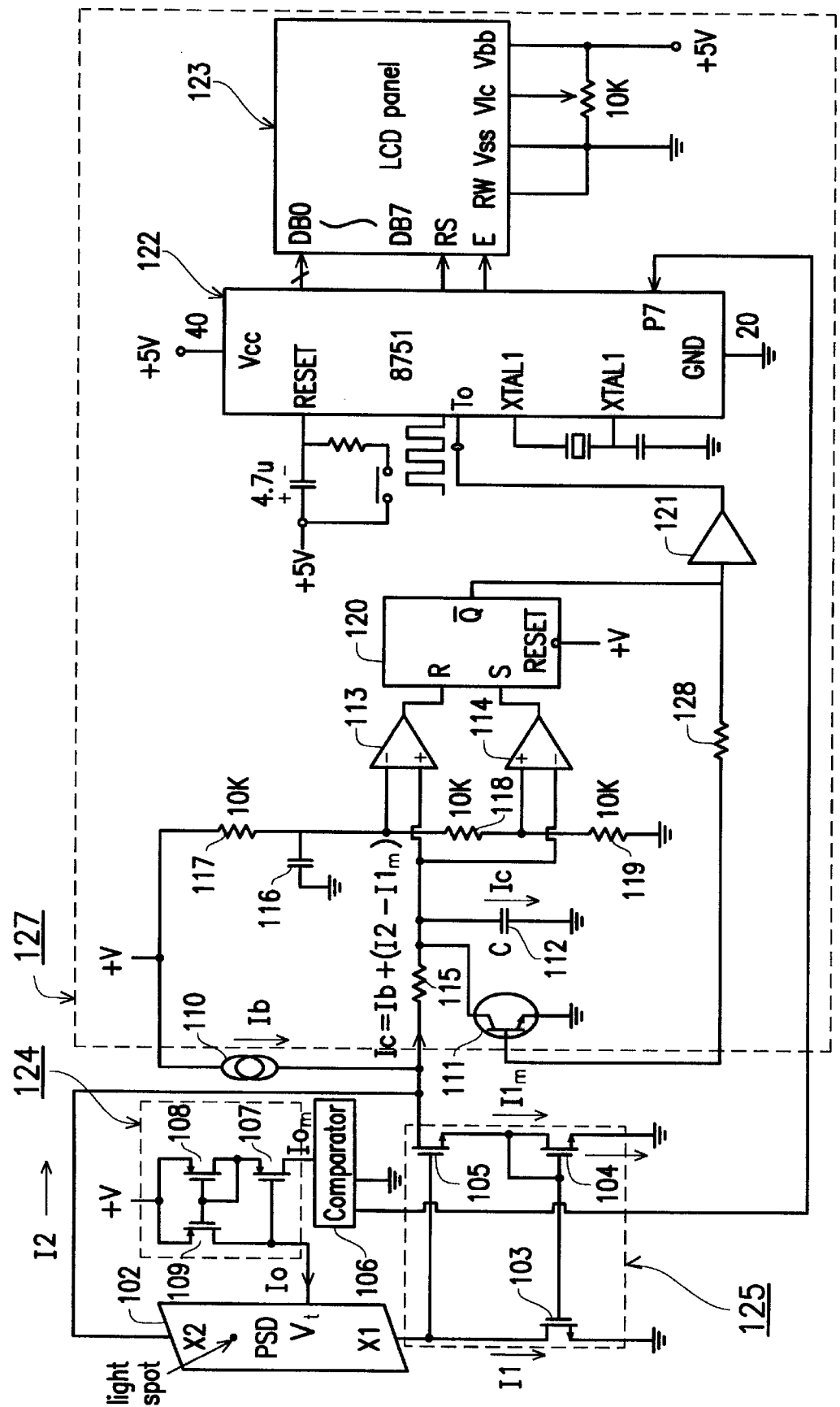
FIG. 4 shows an embodiment according to the present invention.

Now referring to FIG. 4, two photocurrents (I1, I2) are output from two terminals (X1 and X2)of a PSD 102 when a light spot is detected by PSD 102. Working current I0 is provided by PMOSFET (p-channel metal oxide semiconductor field effect transistor) 109 coupled with voltage terminal of PSD 102. A negative current mirror 124 comprising of PMOSFET 107 and PMOSFET 108 is used for mirroring the working current I0. Comparator 106 is used to provide an identification of whether light spot is located on PSD 102. If no light spot is located on PSD 102, a condition I1=I2 still occurs. This condition is the same with that of a light spot located at the middle point of PSD. However comparator 106 can identify the condition to be invalid.

A positive current mirror 125 comprises NMOSFET 103, NMOSFET 104, and NMOSFET 105. Photocurrent I1 output from terminal X1 of PSD 102 is passed through NMOSFET 103; and NMOSFET 104 and NMOSFET 105 are used to mirror the photocurrent I1 to generate a first mirror current I1m having a value substantially equal to I1. NMOSFET 105 is connected to terminal X2 of PSD 102 and to a variable optimum constant-current source 110 wherein the value of Ib should be larger than both maximum of I1m and I2. Then a positive synthesis current Ic=Ib+I2−I1m will flow into capacitor 112, the positive input terminal of a first OP AMP 113 and the negative input terminal of a second OP AMP 114.

When capacitor 112 is charged by the synthesis current Ic over a predetermined voltage level, OP AMP 113 outputs a high voltage level, and OP AMP 114 outputs a low voltage level to drive output terminal $\overline{Q}$ of RS flip-flop 120 to a high voltage level and to turn on switch transistor 111 to discharge capacitor 112.

When capacitor 112 is discharged below a predetermined voltage level, OP AMP 113 outputs a low voltage level and OP AMP 114 outputs a high voltage level to turn off switch transistor 111. Capacitor 112 is charged by the synthesis current Ic again. The above operations of charging and discharging are repeated over and over. As shown in FIG. 4, a buffer 121 is coupled to the output terminal $\overline{Q}$ of RS flip-flop 120; a single chip microprocessor 122 is coupled to buffer 121 and calculates a position based on the formula Ic=Ib+I2−I1m; a LCD panel 123 is coupled to the single chip microprocessor 122 to display a position signal corresponding to said light spot falling on PSD 102.

Figure 1:
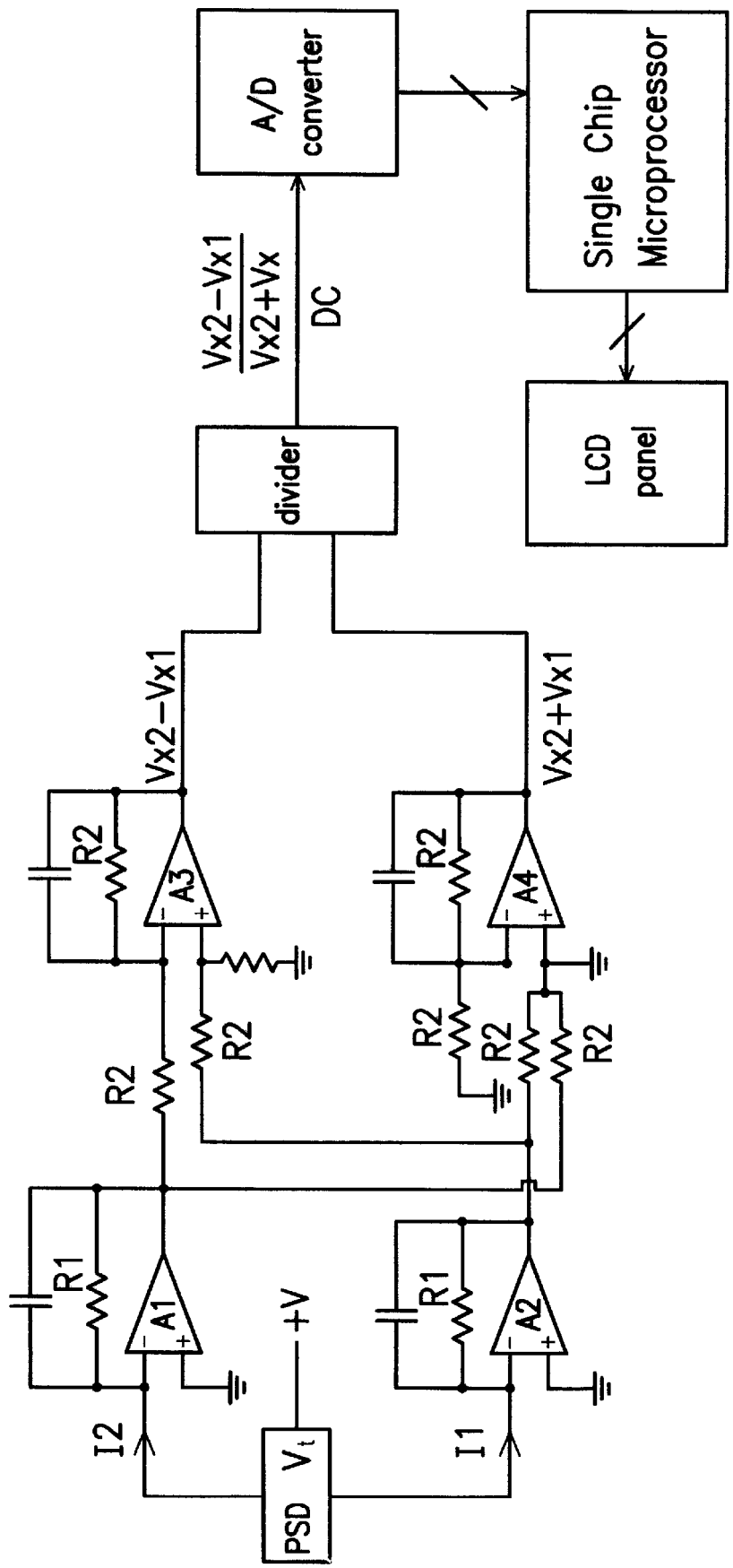
FIG. 1 shows a device capable of converting a position signal into a voltage signal according to the prior art.
Figure 2:
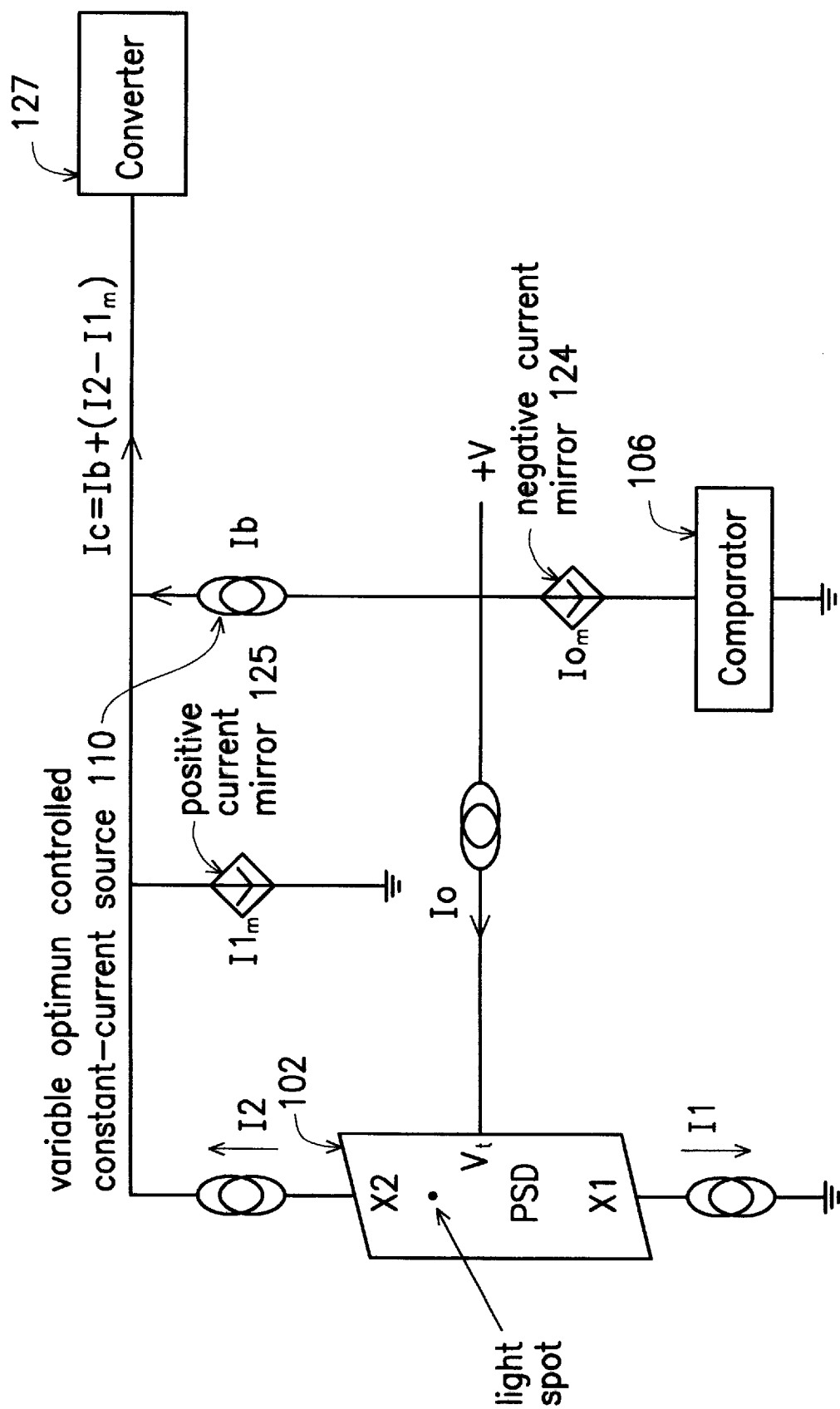
FIG. 2 is a diagram showing a synthesis current applied to charge a capacitor.
Figure 3A:
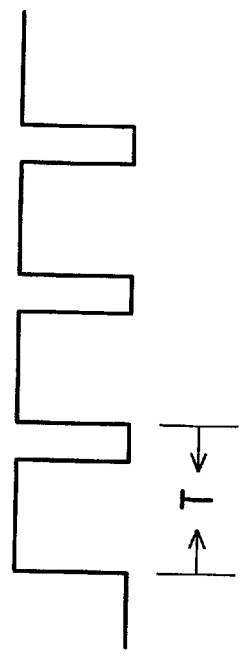
FIG. 3 shows the relationship among a modulated frequency and a corresponding photocurrent difference and a different position.
Figure 3B:
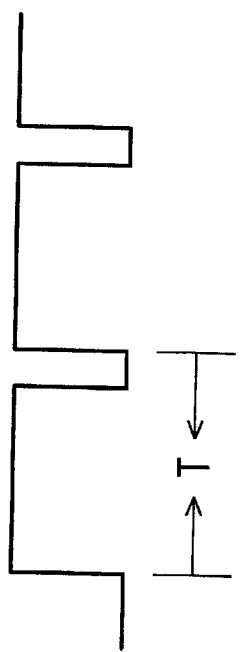
Figure 3C:
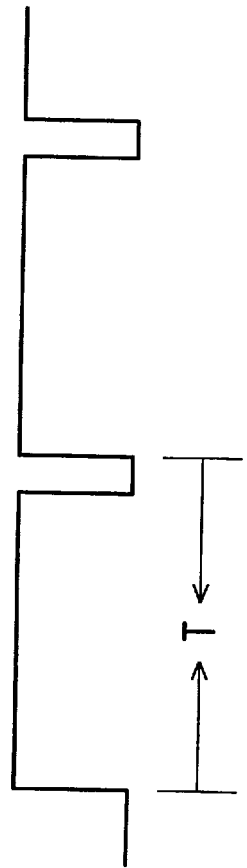

If a light spot is located at a different position on PSD 102, variable photocurrents are output from terminal X1 and terminal X2 to form a variable photocurrent difference and output a different frequency, as shown in FIG. 3. One terminal of resistor R117 and one of resistor R118 are coupled to the negative input terminal of OP AMP 113. The other terminal of resistor R118 and one terminal of resistor R119 are coupled to the positive input terminal of OP AMP 114. The other terminal of resistor 119 is coupled to the ground terminal. The other terminal of resistor R117 is coupled to the power supply. The relationship between the frequency and synthesis current is X(position)=f=kIc/VC, wherein X is the position of the light spot, f is the output frequency, k is a constant which depends on aspect of the voltage divider in the resistors across both the negative input terminal of OP AMP 113 and the positive input terminal of the other OP AMP 114; V is the voltage level of power supply; and C is the capacitance value of capacitor 112. Furthermore, when the values of the resistors 117, 118, 119 are all the same, k is equal to 3.

From the relationship X(position)=f=3Ic/VC, when I1=I2, i.e. a light spot is located at the middle point of PSD 102, synthesis current Ic will be equal to Ib. So the variable optimum constant-current source Ib can be used to define the middle working frequency. On the other hand, if an unbalanced dark current occurs on PSD 102, variable optimum constant-current source 110 may be used to compensate for the unbalanced dark current. If the dark current of terminal X1 is greater than that of terminal X2, the setting value of variable optimum constant-current source 110 should be a little larger than original setting value of variable optimum constant-current source 110 to compensate an unbalanced dark current. If the dark current of terminal X1 is smaller than that of terminal X2, the setting value of variable optimum constant-current source 110 should be a little lower than original value of variable optimum constant-current source 110 to compensate an unbalanced dark current.

As shown in FIG. 4, a method capable of converting a position signal into a frequency signal using a photoelectric position sensitive detector according to the present invention comprises:

(1)providing a PSD 102 having a first output terminal X1, a second output terminal X2, and a voltage terminal Vt wherein the first output terminal X1 of the PSD 102 outputs a first value I1 of a first photocurrent and the second output terminal X2 of the PSD 102 outputs a second value I2 of a second photocurrent when a light spot is detected by the PSD 102;

(2)providing a first current mirror 125 coupled to the first output terminal X1 of the PSD 102, mirroring the first photocurrent to generate a first mirror current I1m having a current value substantially equal to I1, the first current mirror comprising:

a first NMOSFET 103, having a drain coupled to the first output terminal X1 of the PSD 102, a source coupled to a ground terminal, and a gate coupled to a third NMOSFET 104;

a second NMOSFET 105, having a drain coupled to the second output terminal X2 of the PSD 102, a gate coupled to the first output terminal X1 of the PSD 102, and a source coupled to the gate of the first NMOSFET 103; and a third NMOSFET 104, having a gate coupled to the gate of the first NMOSFET 103, a source coupled to the ground terminal, and a drain coupled to the gate of the first NMOSFET 103;

(3)providing a second current mirror coupled to the voltage terminal Vt of the PSD 102 and a power supply, providing a working current I0 equal to a sum of the first photocurrent and the second photocurrent to the PSD, the second current mirror comprising:

a first PMOSFET 109, having a drain coupled to the voltage terminal Vt of the PSD 102 and providing the working current I0 to the PSD, a source coupled to a power supply, and a gate coupled to a second PMOSFET 108;

a second PMOSFET 108, having a source coupled to the power supply, a gate coupled to the gate of the first PMOSFET 109, and a drain coupled to the gate of the first PMOSFET 109;

and a third PMOSEET 107, having a gate coupled to the voltage terminal Vt of the PSD 102, a source coupled to the drain of the second PMOSFET 108, and a drain coupled to a comparator 106 that is utilized to provide an identification whether the light spot is located on the PSD 102;

(4) providing a variable optimum constant-current source 110 coupled to the second output terminal X2 of the PSD 102, generating a constant current having a third value Ib, wherein Ib is larger than both the maximum values of the I1m and the I2; and (5) providing a converter 127 coupled to the second output terminal X2 of the PSD 102, having a capacitance value, converting a synthesis current Ic into a frequency signal via a relationship X=f=kIc/VC, wherein X is the position signal of the light spot falling on the PSD 102; f is the frequency signal of the light spot; k is a constant which depends on aspect of the voltage divider in the resistors R117, R118, R119 across both the negative input terminal of OP AMP 113 and the positive input terminal of the other OP AMP 114; C is the capacitance value of the capacitor 112 of the converter; and V is the voltage level of the power supply.

Having described the invention in connection with preferred embodiments, modifications will now doubtlessly be apparent to those skilled in this technology. The foregoing description of the preferred embodiments of the invention has been provided for the purposes of illustration and description. It is not intended to be exhaustive or to limit the invention to the precise embodiment disclosed herein. The disclosed embodiment has been chosen and described to best explain the principles of the invention and its practical application, thereby enabling others skilled in this technology to understand the invention, to practice various other embodiments thereof and to make various modifications suited to the particular use contemplated of the present invention. As such, it is intended that the scope of this invention shall not be limited to the disclosed, but rather shall be defined by the following claims and their equivalents.

What is claimed is:

1. A method capable of converting a position signal into a frequency signal using a photoelectric position sensitive detector, said method comprising:

providing a PSD having a first output terminal, a second output terminal, and a voltage terminal wherein said first output terminal of said PSD outputs a first value I1 of a first photocurrent and said second output terminal of said PSD outputs a second value I2 of a second photocurrent when a light spot is detected by said PSD;

providing a first current mirror coupled to said first output terminal of said PSD, mirroring said first photocurrent to generate a first mirror current I1m having a value substantially equal to said I1;

providing a second current mirror coupled to said voltage terminal of said PSD and a power supply, providing a working current I0 equal to a sum of said first photocurrent and said second photocurrent to said PSD and mirroring said working current to generate a second mirror current I0m having a value substantially equal to said I0;

providing a variable optimum constant-current source coupled to said second output terminal of said PSD, generating a constant current having a third value Ib, wherein Ib is larger than both the maximum values of said I1 and said I2; and providing a converter coupled to said second output terminal of said PSD, at least comprising a capacitor, converting a synthesis current Ic=Ib+I2−I1m into a frequency signal via a relationship X=f=kIc/VC, wherein X is the position signal of said light spot; f is the frequency signal of said light spot; k is a constant; C is a capacitance value of said capacitor of said converter; and V is the voltage level of said power supply.

2. The method of claim 1, wherein said second current mirror comprises:

a first PMOSFET, having a drain coupled to said voltage terminal of said PSD and providing said first current to said PSD, a source coupled to said power supply, and a gate;

a second PMOSFET, having a source coupled to said power supply, a gate coupled to said gate of said first PMOSFET and a drain coupled to said gate of said first PMOSFET;

and a third PMOSFET, having a gate coupled to said voltage terminal of said PSD, a source coupled to said drain of said second PMOSFET, and a drain coupled to a comparator that is utilized to provide an identification whether said light spot is located on said PSD.

3. The method of claim 1, wherein said first current mirror comprises:

a first NMOSFET, having a drain coupled to said first output terminal of said PSD, a source coupled to a ground terminal, and a gate;

a second NMOSFET, having a drain coupled to said second output terminal of said PSD, a gate coupled to said first output terminal of said PSD, and a source coupled to said gate of said first NMOSFET; and a third NMOSFET, having a gate coupled to said gate of said first NMOSFET, a source coupled to said ground terminal, and a drain coupled to said gate of said first NMOSFET.

4. A device capable of converting a position signal into a frequency signal using a photoelectric position sensitive detector, comprising:

a PSD, having a first output terminal, a second output terminal, and a voltage terminal wherein said first output terminal of said PSD outputs a first value I1 of a first photocurrent and said second output terminal of said PSD outputs a second value I2 of a second photocurrent when a light spot is detected by said PSD;

a first current mirror, coupled with said first output terminal of said PSD, mirroring said first photocurrent to generate a first mirror current I1m having a current value substantially equal to said I1;

a second current mirror, coupled with said voltage terminal of said PSD, providing a working current I0 equal to a sum of said first photocurrent and said second photocurrent to said PSD and mirroring said working current to generate a second mirror current I0m having a current value substantially equal to said I0;

a variable optimum constant-current source, coupled to said second output terminal of said PSD, generating a constant current having a third value Ib, wherein Ib is larger than both the maximum values of said I1 and said I2; and a converter, coupled to said second output terminal of said PSD, converting said first mirror current, said second photocurrent, and said constant current into a frequency signal.

5. The device of claim 4, wherein said second current mirror comprises:

a first PMOSFET, having a drain coupled to said voltage terminal of said PSD and providing said first current to said PSD, a source coupled to a power supply, and a gate;

a second PMOSFET, having a source coupled to said power supply, and a gate coupled to said gate of said first PMOSFET, and a drain coupled to said gate of said first PMOSFET;

and a third PMOSFET, having a gate coupled to said voltage terminal of said PSD, a source coupled to said drain of said second PMOSFET, and a drain coupled to a comparator that is utilized to provide an identification whether said light spot is located on said PSD.

6. The device of claim 4, wherein said first current mirror comprises:

a first NMOSFET, having a drain coupled to said first output terminal of said PSD, a source coupled to a ground terminal, and a gate;

a second NMOSFET, having a drain coupled to said second output terminal of said PSD, a gate coupled to said first output terminal of said PSD, and a source coupled to said gate of said first NMOSFET; and a third NMOSFET, having a gate coupled to said gate of said first NMOSFET, a source coupled to said ground terminal, and a drain coupled to said gate of said first NMOSFET; and said converter comprises:

a first resistor, coupled to said second output terminal of said PSD;

a capacitor, coupled to said resistor, having a synthesis current passing through with a value Ic=Ib+I2−I1m;

a first OP AMP, having a positive input terminal coupled to said charging and discharging path, an output terminal, and a negative input terminal;

a second OP AMP, having a negative input terminal coupled to said charging and discharging path, an output terminal, and a positive input terminal;

a second resistor, having a first terminal coupled to said power supply, and a second terminal coupled to said negative input terminal of said first OP AMP;

a third resistor, having a first terminal coupled to said negative input terminal of said first OP AMP and a second terminal coupled to said positive input terminal of said second OP AMP;

a fourth resistor, having a first terminal coupled to said positive input terminal of said second OP AMP and a second terminal coupled to said ground terminal, wherein a voltage of said third resistor on the aspect of the voltage divider in said second resistor, said third resistor, and said fourth resistor is used to determine said constant k;

an RS flip-flop, having a first input terminal R coupled to said output terminal of said first OP AMP, a second input terminal S coupled to said output terminal of said second OP AMP, and an output terminal $\overline{Q}$;

a switch transistor, connected in parallel with said capacitor;

a buffer, coupled to said output terminal $\overline{Q}$ of said RS flip-flop;

a single chip microprocessor, coupled to said buffer;

a LCD panel, coupled to said single chip microprocessor to display a position signal corresponding to said light spot falling on said PSD; and when said capacitor is charged by said synthesis current over a predetermined voltage level, said first OP AMP outputs a high voltage level, and said second OP AMP outputs a low voltage level to drive said output terminal $\overline{Q}$ of said RS flip-flop to a high voltage level and to turn on said switch transistor to discharge said capacitor; and when said capacitor is discharged below said predetermined voltage level, said first OP AMP outputs a low voltage level and said second OP AMP outputs a high voltage level to turn off said switch transistor to charge said capacitor by said synthesis current again; and a frequency corresponding to a photocurrent difference between said first photocurrent and said second photocurrent is output from said buffer to said single chip microprocessor and is converted into a position signal via said single chip microprocessor.

7. The device of claim 4, wherein said variable optimum constant-current source can be used to compensate a dark current difference between said first output terminal of said PSD and said second output terminal of said PSD.

* * * * *